3,016,318
FABRIC COVERED CELLULAR CUSHIONING ARTICLE AND MANUFACTURE THEREOF

Charles F. Sudman, Akron, Ohio, assignor to The Goodyear Tire & Rubber Company, Akron, Ohio, a corporation of Ohio
No Drawing. Filed July 15, 1959, Ser. No. 827,137
11 Claims. (Cl. 154—54)

This invention relates to improvements in contoured articles having cushioning bodies of cellular elastomeric material covered with a fabric material. More particularly the invention relates to such articles in which the cellular elastomeric material adhers directly to the fabric covering without affecting the porosity, flexibility, feel and hand, strength, appearance, and color of the fabric, and to a novel method of making such articles.

In the construction of cushioning articles, such as transportation seating used particularly in automobiles, household furniture such as overstuffed chairs and davenports, mattresses, topper pads and breast pads, which are padded or cushioned with foamed elastomeric materials, it is desirable to cover the foamed elastomeric material with a porous covering material, such as a fabric having desirable properties or porosity, flexibility, feel and hand, strength, appearance, and other desirable exterior surface characteristics depending upon the particular use intended. Heretofore these articles were made by first molding a body of foamed elastomeric material into the desired shape and then covering or encasing the molded material in the desired fabric material. This process is costly since it involves skilled tailoring of the fabric to the contour of the molded body of foamed elastomeric material. The use of an adhesive to secure the fabric to the molded foamed body involves a difficult preforming operation which was necessary in order to produce a smoothly finished article. Also the properties of the fabric were changed by virtue of the adhesive used. To insure producing a smoothly finished article, it was decided to first shape the fabric to the contour of the mold and then pour the foamed material on top of the fabric lining in the mold. Again difficulties arose because the foamed material tended to strike through the pores of the fabric causing the fabric to lose its desirable hand and feel, staining the surface, and in some instances causing the foam to break down immediately adjacent the surface of the fabric thereby forming pockets or voids and leaving the fabric unsupported at these places.

It is an object of the present invention to provide a contoured molded composite article having a foamed elastomeric body strongly adhered to a porous covering material while at the same time maintaining the porosity, flexibility, feel and hand, strength, and appearance of the covering material.

Another object is to provide a method of molding a composite cellular cushioning article having a foamed elastomeric body intimately associated with a porous covering material by casting the foamed elastomeric material directly onto the surface of the preformed porous covering material without changing the properties, particularly the hand and feel, of the covering material.

The foregoing objects of this invention are realized by treating the porous covering material with a polymeric sizing composition having the property of imparting to the porous covering material repellency to water and resistance to absorption and soiling by oily and greasy materials. Specific embodiments of a desirable fabric treating composition are the polymers of the acrylic esters of fluorocarbon compounds, particularly the perfluoroalkane sulphonamido alkanols.

It has been discovered that, when a porous covering material is treated with the fluorocarbon compounds herein disclosed, the material used in producing the cushioning body of the articles of this invention does not strike-through nor fill-up the voids or open areas of the fabric while most unexpectedly permitting the cushioning material to adhere tenaciously to the surface of the fibers of the fabric, thus producing a tightly bonded union between the body of cushioning material and the covering material while at the same time leaving the covering material in its original porous, flexible condition having its original feel and hand, strength, and appearance.

It is desirable that a cushioning element particularly those coming in contact with the body possess the ability to transmit moisture vapor or permit the removal of moisture vapor from the body. This condition is particularly noticeable when the cushioning element is made of a cellular material having intercommunicating cells and covered with a porous fabric. In general any porous fabric can be used and it is preferred to use a covering material which is capable of yielding or stretching in all directions so as to take on the outline of the contour of the mold being used. Of particular value are the knit textiles, such as jersey, tricot, and milanaise. Other porous fabrics that may be used in this invention include fabrics made of cotton, wool, nylon, Orlon, Acrilan, Vinyon, Dynel, and combinations thereof. Dynel is the trade name of a fiber made of the copolymer of acrylonitrile and vinyl chloride and specifically made of the copolymer of 60 parts acrylonitrile and 40 parts vinyl chloride which is then extruded to form a tow which is crimped and cut to staple lengths and then drawn and twisted into yarn and then woven into fabric, all in accordance with known methods.

In all instances where a porous covering material is used having the desired properties of stretch to conform to the contour of the mold, the materials used in making the cushioning material, particularly foamed rubber latex, tend to strike-through the openings of the fabric covering and interfere with the porosity and alter the other desirable properties of the material. This strike-through is prevented without interfering with a proper bonding of the fabric to the cushioning body by treating the textile fabrics with a coating or sizing of the polymers of the fluorocarbon compounds of the class consisting of the acrylate esters and methacrylate esters of N-alkyl, N-alkanol perfluoroalkane sulphonamides having the structure formula

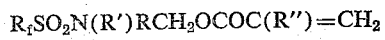

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms (methyl, ethyl, propyl, butyl, amyl or hexyl), and R" is hydrogen or methyl. The structure of the acrylate polymer molecule is indicated by the following formula of the recurring ester unit

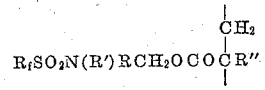

In addition to homopolymers of these monomeric esters, copolymers thereof with polymerizable monomers containing an ethylenic linkage may also be used as a sizing material, including acrylonitrile, vinyl chloride, styrene, methyl acrylate, ethylene, isoprene, butadiene, and maleic anhydride.

These sizing compounds may be made up as an emulsion in accordance with the teaching of United States Patent 2,803,615 and applied to various fabric materials by dipping the fabric into the sizing composition containing 1 to 20% solids by weight and then passing the dipped fabric between squeeze rolls to remove excess sizing and then drying the treated fabric at for example about 140° C. for ten minutes.

The foamed articles of the present invention may be made by placing the desired shape and size of fabric treated with the sizing materials described above across the opening of a mold and drawing the fabric into the mold by suction. Suction is created in the mold by placing a sheet of air impervious material on top of the fabric and then drawing the fabric into the mold. Foamed material, such as foamed rubber latex, or foamable material, such as used in making polyurethane foam, is then poured into the mold or expanded between the mold parts, which parts are brought together and held in proper relation to each other until the foam has been converted to a desirable cushioning element by means of heat or chemical action. If it is desired to make the upholstered cushioning element with a rigid or resilient support member built in or embedded in the cushion, one need only insert the desired type of supporting frame in the mold after the fabric has been conformed to the contour of the mold and then pour the foamed or foamable material into the mold, thereby causing the frame to become embedded in the cushion and thus providing a completed upholstered seat construction in a facile, efficient, and economical manner.

The following example is illustrative of a method of making the improved cushioning element of this invention. All parts are by weight unless otherwise specified.

The sizing ingredient is the homopolymer of the acrylate ester of N-propyl, N-ethanol perfluoro-octane sulphonamide having the general formula $$C_8F_{17}SO_2N(C_3H_7)CH_2CH_2OCOCH=CH_2$$

polymerization of which is brought about, as taught in Example 1 of U.S. Patent 2,803,615, by reacting 1400 parts of the acrylate ester of the perfluoro-octane sulphonamide monomer in the presence of 1760 parts of oxygen-free water, 760 parts of acetone, 7 parts of potassium persulfate as the catalyst and 70 parts of the potassium salt of N-ethyl, N-perfluoro-octane sulphonyl glycine as the emulsifying agent. A conversion of 83% is reached in 90 minutes when the reaction is heated at 50° C. The resulting product is a stable aqueous latex dispersion of the homopolymer of the acrylate ester of the N-propyl, N-ethanol perfluoro-octane sulphonamide containing about 30% polymer solids. The latex sizing solution is prepared by diluting the aqueous latex dispersion of the homopolymer with water to 4% solids. The Dynel fabric is immersed in this solution and then passed between squeeze rolls to remove excess solution and dried by heating at 140° C. for ten minutes. The Dynel fabric pre-cut to a size and shape to take the contour of the mold used in forming the cushioning element of this invention is placed across the top of the mold and made impervious to the passage of air by placing a sheet of vinyl film thereon. The Dynel fabric is then heated to approximately 300° F. and then drawn into the mold by a vacuum developed in the mold. The Dynel fabric conforms uniformly and smoothly to the inside contour of the mold. The sheet of vinyl plastic is then removed and a quantity of foamed rubber latex poured into the mold on top of the Dynel fabric and gelled and vulcanized in a conventional and well known manner.

When an upholstered cushioning element is made in accordance with the present invention, there are no signs of collapsed areas, i.e. areas immediately below the surface of the upholstering fabric where the cushioning material has not formed or has collapsed away from the fabric during cure leaving a void. The strength of the bond between the sponge and the treated Dynel fabric is of such a value that it takes a considerable pull on one corner of the fabric to part it from the cushioning material. The Dynel fabric retains the same properties of porosity, flexibility, feel and hand, strength, and appearance as it has before it is integrally bonded to the cushioning material.

The cushioning element may be made of foam rubber latex, vinyl foam, or any other material having cushioning properties similar to foam rubber latex, such as the polyurethane foams which may be generally made from liquid polymeric reaction mixtures containing polyisocyanates, active-hydrogen-containing polymeric materials, and a reticulator such as water. The active-hydrogen of the polymeric materials reacts with the isocyanate groups of the polyisocyanates to form a network of cross-linked molecular chains. The polyisocyanate not only functions as a chain extender and a cross linker but also reacts with the hydroxyl groups of the water to generate $CO_2$ which causes the liquid reaction mixture to expand and foam. Examples of active-hydrogen-containing polymeric materials are polyesters, polyesteramides, and polyalkylene ether glycols and mixtures thereof.

The rubber latex foam comprises a water dispersion of rubber particles and, when the foam is poured upon a porous fabric of the nature described above which has not been treated in accordance with the teaching of this invention, the foam strikes-through the interstices of the fabric filling-in the voids and coating the fibers of the fabric causing the fabric to become less porous, stiff, and discolored. When this same foamed rubber latex is poured upon any of the fabrics mentioned above and treated as described above for Dynel, the latex does not strike through nor penetrate into the pores of the fabric but rather remains on the one side of the fabric forming a tight bond therewith. The porosity of the fabric as well as its flexibility, feel and hand, strength, and appearance is unaffected.

While certain representative embodiments and details have been shown for the purpose of illustrating the invention, it will be apparent to those skilled in this art that various changes and modifications may be made therein without departing from the spirit or scope of the invention.

What is claimed is:

1. The method of making cushioning elements having a body of foamed elastomeric material and a porous covering material associated therewith, which includes applying to the surface of said covering material a polymer having a skeletal chain containing fluorocarbon acrylate ester units indicated by the formula

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R" is hydrogen or methyl, forming a foamed elastomeric material onto the treated covering material and curing the foamed material.

2. The method of making cushioning elements having a body of foamed elastomeric material and a porous covering material asociated therewith, which includes applying to the surface of said covering material a polymer having a skeletal chain containing fluorocarbon acrylate ester units indicated by the formula

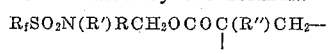

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R" is hydrogen or methyl, causing said treated covering material to conform to the contour of a mold for shaping the cushioning element, forming a foamed elastomeric material onto the covering material and curing the foamed material.

3. The method of making molded composite articles having a body of foamed elastomeric material and a covering of fabric material, which includes applying to the surface of said fabric material a polymer having a skeletal chain containing fluorocarbon acrylate ester units indicated by the formula

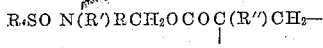
$$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, causing said treated fabric material to conform to the interior of a mold having the contour of the finished article, molding uncured foamed elastomeric material onto the formed fabric material and curing the foamed material.

4. The method of making molded cushioning elements having a body of foamed elastomeric material and a heat-formable porous covering material, which comprises applying to the surface of said covering material a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, causing said treated covering material to conform to the interior of a mold having the contour of the finished article by applying heat thereto, forming a foamed elastomeric material onto the covering material and curing the foamed material thereto.

5. The method of making molded composite articles having a body of foamed rubber latex sponge and a fabric material associated therewith, which includes applying to the surface of said fabric material a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, causing said treated fabric material to conform to the interior of a mold having the contour of the finished article, pouring foamed rubber latex onto the treated fabric material and curing the foamed material thereto.

6. The method of making a molded cushioning article having a body of polyurethane foam and a fabric material asociated therewith, which comprises applying to the surface of said fabric material a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, forming a polyurethane foam onto the treated fabric material.

7. A cushioning element comprising a body of foamed elastomeric material and a porous covering material bonded thereto on one side thereof and protected therefrom by a coating of a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl.

8. A molded cushioning element comprising a woven fabric made of fibers treated with a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, and a molded body of a foamed elastomeric material bonded thereto.

9. A molded cushioning element comprising a woven fabric made of fibers of a heat-formable polymer treated with a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, and a molded body of a foamed elastomeric material bonded thereto.

10. A molded cushioning element comprising a woven fabric made of fibers of a copolymer of acrylonitrile and vinyl chloride treated with a polymer having a skeletal chain containing fluorocarbon acrylate ester units indicated by the formula $$R_fSO_2N(R')RCH_2OCOC(R'')CH_2-$$

wherein $R_f$ is a perfluoroalkyl group containing 4 to 12 carbon atoms, R is an alkylene bridging group containing 1 to 12 carbon atoms, R' is an alkyl side group containing 1 to 6 carbon atoms, and R'' is hydrogen or methyl, and a molded body of a foamed elastomeric material bonded thereto.

11. A molded cushioning element comprising a woven fabric made of fibers of a copolymer of acrylonitrile and vinyl chloride treated with a polymer having a skeletal chain containing fluorocarbon acrylate ester units indicated by the formula $$C_8F_{17}SO_2N(C_3H_7)CH_2CH_2OCOCHCH_2$$

and a molded body of a foamed elastomeric material bonded thereto.

References Cited in the file of this patent

UNITED STATES PATENTS

| | | |
|---|---|---|
| 2,785,440 | Toulmin | Mar. 19, 1957 |
| 2,803,615 | Ahlbrecht et al. | Aug. 20, 1957 |